Jan. 7, 1947.　　W. C. TRAUTMAN ET AL　　2,413,896
FLOW EQUALIZER
Filed April 23, 1945　　2 Sheets—Sheet 1

*INVENTOR.*
W. C. TRAUTMAN
A. A. MEDDOCK
BY
E. Woodbury
*ATTORNEY*

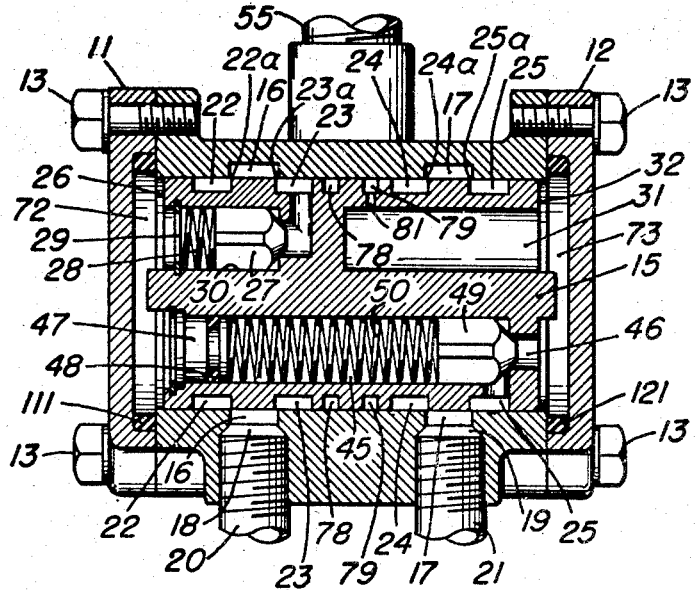
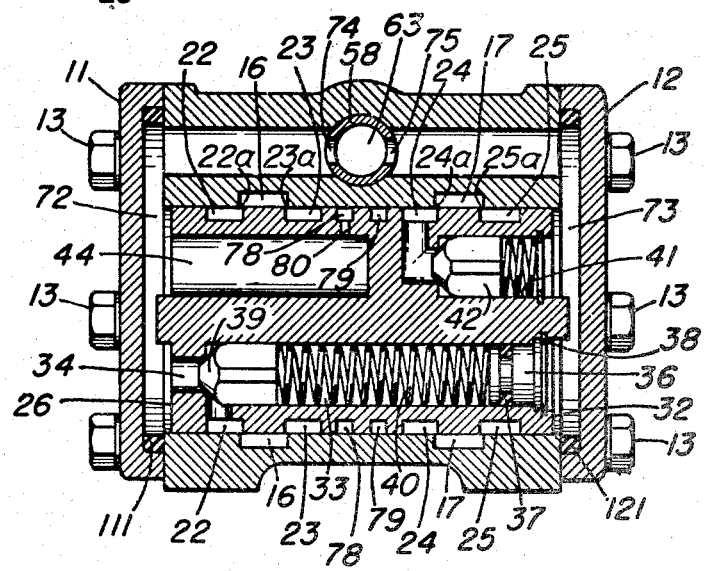

Patented Jan. 7, 1947

2,413,896

UNITED STATES PATENT OFFICE 2,413,896

FLOW EQUALIZER

Walter C. Trautman, Los Angeles, and Alvin A. Meddock, North Hollywood, Calif., assignors to Bendix Aviation Corporation, South Bend, Ind., a corporation of Delaware Application April 23, 1945, Serial No. 589,772

7 Claims. (Cl. 137—165)

This invention relates to equalizer valves for equalizing fluid flow in a pair of branch lines, and more particularly to a reversible equalizer valve of the type disclosed in application of Walter C. Trautman, Serial No. 502,877, filed September 18, 1943, which equalizes the flow in a pair of branch lines irrespective of whether the flow is from the common line into the branch lines, or from the branch lines into the common line.

An object of the invention is to provide a reversible flow equalizer valve that is particularly simple in construction and easily assembled and disassembled.

Another object is to provide a reversible flow equalizer valve of such construction that it can be readily and inexpensively manufactured.

Other more specific objects and features of the invention will become apparent from the detailed description to follow of a preferred embodiment of the invention.

The present invention is an improvement of the valve disclosed in the aforementioned application Serial No. 502,877, which contains a shuttle valve consisting of a short, pressure-responsive piston of substantial diameter working in a relatively short cylinder and having a pair of piston valves of substantially smaller diameter extending from its opposite sides into valve cylinders of corresponding diameter. A reversible flow equalizer valve also incorporates check valves for directing flow to one set of ports controlled by the piston valves when the flow is from the common line to the branch lines and for directing the fluid to other ports controlled by the piston valves when the flow is from the branch lines into the common line, and in the earlier application these check valves were positioned in the body of the valve exterior of the piston.

In accordance with the present invention, the structure of the earlier application has been simplified, while preserving the same general mode of operation, by employing a single piston of substantial diameter and length as the piston valve, and utilizing the opposite ends of this piston as the pressure faces against which the controlling pressures are applied. Further simplification is effected by locating the check valves within the piston itself. This not only makes possible the use of a much simpler and less expensive valve body, but facilitates the assembly of the check valves and reduces the weight of the piston. A light piston is desirable because it has less inertia and responds more quickly to correct any tendency toward inequality in the rates of flow.

In the drawings:

Fig. 4 is a section taken in the plane IV—IV of Fig. 1; and

Fig. 5 is a section taken in the plane V—V of Fig. 2, which is at right angles to the section of Fig. 4.

Figure 1:
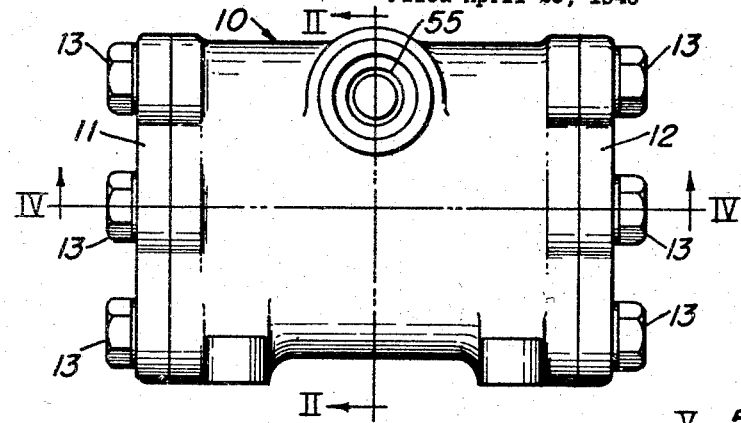
Fig. 1 is an exterior view of a valve in accordance with the invention.

The valve disclosed comprises a housing or casing consisting of a body 10 and a pair of end plates 11 and 12, respectively, which are secured to opposite ends of the body by cap screws 13. The body defines a main cylinder 14, the opposite ends of which are closed by the end plates 11 and 12 and which contains a main piston 15 which has four check valves therein, to be described later.

The main cylinder 14 contains two annular grooves 16 and 17 which are in constant communication with a pair of outlet ports 18 and 19 adapted to be connected to branch lines 20 and 21 respectively. The piston 15 has a pair of annular grooves 22 and 23 cooperating with the cylinder groove 16 to variably control flow therein and also a pair of annular grooves 24 and 25 cooperating with the cylinder groove 17 to control flow therein.

The piston 15 contains four check valves for selectively communicating the different piston grooves 22, 23, 24, and 25 with opposite ends of the main cylinder.

Thus, the groove 23 communicates with the left end 26 of the piston through a cylindrical passage 30. This passage 30 has a seat at its inner end which is normally closed by a check valve 27, which is slidable in the passage 30 and is urged into closed position by a helical compression spring 28 compressed between the left end of the valve 27 and a split retaining ring 29 in a groove provided therefor in the passage 30. Fluid can, therefore, flow from the piston groove 23 to the left end face 26 of the piston, but reverse flow is prevented.

A passage 31 aligned with passage 30 extends into the piston from the right end face 32 thereof, but this is a blind passage provided primarily to lighten the piston, although it also saves an additional purpose to be described later.

The piston groove 22 (Fig. 5) is also connected to the left end 26 of the piston through cylindrical passages 33 and 34 in the piston. The passage 33 extends into the piston from the right end 32 thereof, but it is closed at its right end by a plug 36 having a groove containing a sealing ring 37, the plug 36 being retained in position by a split retaining ring 38. A check valve 39 urged to the left by a helical compression spring 40 compressed between the rear end of the valve 39 and the plug 36 prevents flow of fluid from the groove 22 to the left end of the piston while permitting flow in the reverse direction.

The groove 24 in the piston is connected to the right end of the piston through a cylindrical passage 41 containing a check valve 42 similar to the check valve 27, so that fluid can flow from the groove 24 to the right end 32 of the piston but cannot flow in the reverse direction. A hole 44 entering the piston from the left end is provided in alignment with the passage 41 to lighten the piston, and provide a connection to be described later.

The groove 25 is communicated with the right end 32 of the piston through a passage 45 and a passage 46 similar to the pasages 33 and 34 respectively. A closure plug 47 having a sealing ring 48 prevents fluid flow between the passage 45 and the left end of the piston, and a check valve 49 urged to the right by a spring 50, prevents fluid flow from groove 25 to the right end of the piston, while permitting reverse flow.

Figure 2:
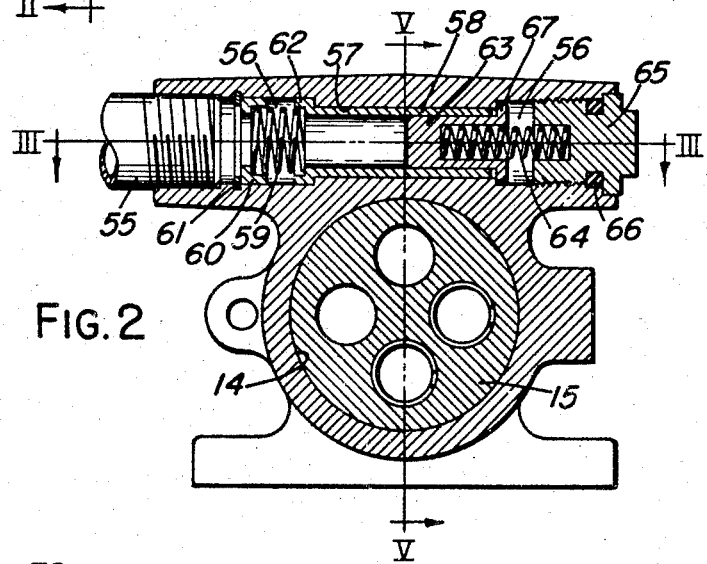
Fig. 2 is a section taken in the plane II—II of Fig. 1.

The main piston 15 controls flow between the branch lines 20 and 21 and the opposite ends of the main cylinder 14, and the opposite ends of the cylinder are connected to a common line 55. Thus, referring to Fig. 2, the common line 55 communicates with one end of a cylindrical passage 56 which extends through the body transversely with respect to the main cylinder 14. The mid-portion of the passage is slightly reduced to form a cylinder 57 which slidably receives a sleeve 58 which is urged to the right by a helical compression spring 59 compressed between the left end of the sleeve and a retainer ring 60, the latter being held by a split ring 61. The sleeve 58 has a shoulder 62 at its left end, which shoulder seats against the shoulder at the left end of the cylinder 57 to limit movement of the sleeve by the spring 59.

There is positioned within the sleeve 58 a piston 63 which is urged into the right end of the sleeve by a helical compression spring 64 compressed between the piston and a closure plug 65 which is screwed into the right end of the passage 56 and has a sealing ring 66 for effecting a fluid seal. The piston 63 has a shoulder 67 on its right end which abutts against the shoulder at the right end of the cylinder 57 to limit movement of the piston by the spring 64.

Figure 3:
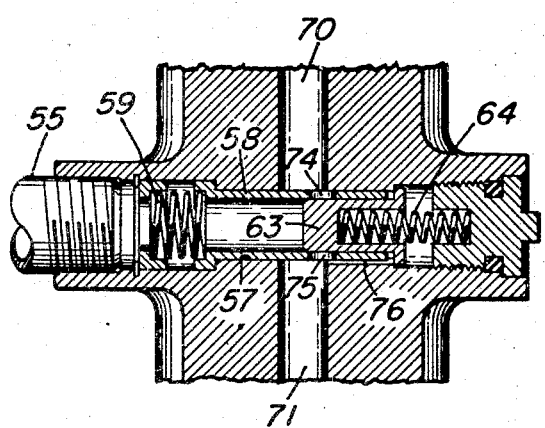
Fig. 3 is a section taken in the plane III—III of Fig. 2.

Referring now to Figs. 3 and 5, the cylinder 57 is intersected by a pair of aligned passages 70 and 71 which extend to the opposite ends of the body 10 (Fig. 5) and communicate with chambers 72 and 73 defined by the body member 10 and the end closure members 11 and 12, respectively. Suitable seals 111 and 121 are provided to effect a fluid-tight closure between the cover plates 11 and 12 and the body. As is apparent, the chamber 72 communicates with the left end of the piston 15 and the chamber 73 communicates with the right end.

Referring again to Fig. 3, the sleeve 58 has a pair of ports 74 and 75 in its wall, which ports are in constant communication with the passages 70 and 71 respectively, but are normally blocked by the piston 63. The front end of the piston 63 is exposed to the pressure of fluid in the common line 55, and the rear end of the piston is exposed to the pressure existing in the passage 71, which is transmitted through a small passage 76 to the rear end of the piston. The result is that when the pressure in the common line 55 exceeds the pressure in passage 71 by an amount sufficient to overcome the force of spring 64, the piston 63 is moved to the right to uncover the ports 74 and 75 and permit flow therethrough to the passages 70 and 71. Since the differential pressure must overcome the force of the spring 64 before the piston 63 is moved to uncover the ports 74 and 75, the spring-actuated piston functions to produce pressure drops between the common line and the passages 70 and 71 when the flow is from the common line 55 into the valve.

When the flow is from the valve into the common line 55, the pressure in the passage 71 exceeds the pressure in the common line and this differential pressure acting against the right end of the sleeve 58 overcomes the force of the spring 59 and moves the sleeve to the left until the ports 74 and 75 are uncovered.

The spring-controlled piston and sleeve, therefore, function to introduce a desired pressure drop at the ports 74 and 75, irrespective of the direction of flow.

The valve functions as follows when the direction of flow is from the common line 55 into the branch lines 20 and 21:

Fluid entering the passage 56 from the common line 55 moves the piston 63 to uncover the ports 74 and 75 and permit fluid flow through the passages 70 and 71 to the end chambers 72 and 73 of the valve. If the flow through both passages 70 and 71 is equal, then the pressure drops through the ports 74 and 75 are equal, and equal pressures exist in the chambers 72 and 73, the pressures being slightly less than that in the common line 55 because of the pressure drops at the ports 74 and 75.

Pressure fluid in chamber 72 functions to seat the check valve 27 so that no flow occurs therepast. However, the pressure opens check valve 39, permitting fluid to flow into the piston groove 22 and past the shoulder 22a of this groove into the body groove 16 and thence into the branch line 20. At the same time, the pressure fluid in the chamber 73 holds the check valve 42 on its seat, but opens the check valve 49 permitting fluid to flow into the piston groove 25 and past the shoulder 25a thereon into the cylinder groove 17 and thence to the branch line 21.

So long as the pressures are equal in chambers 72 and 73, the piston 15 will be centrally located and the resistance to flow from piston groove 22 past shoulder 22a into cylinder groove 16 will be equal to the resistance to flow from piston groove 25 past shoulder 25a into the cylinder groove 17. However, if the fluid tends to flow faster into branch 21 than into branch 20, the pressure drop through port 75 (Fig. 3) will be greater than the pressure drop through port 74, and the pressure in chamber 73 will become less than that in chamber 72, moving the piston 15 to the right and causing shoulder 25a to increasingly throttle flow into the branch line 21 and causing shoulder 22a to decreasingly throttle flow into the branch line 20. The result is that the flows are again substantially equalized by the movement of the piston, since the movement will be of whatever extent is necessary to bring the pressures in the chambers 72 and 73 back to equality.

Of course, if the increased flow occurs in the branch 20 rather than 21, the pressures are reversed and the piston moves in the opposite direction to increasingly throttle flow from piston groove 22 into the cylinder groove 16 and decreasingly throttle flow from the piston groove 25 into the cylinder groove 17.

When the direction of flow is from the branch lines into the common line, fluid entering the branch passages 18 into the cylinder groove 17 cannot flow through piston groove 22 to the left end of the piston because check valve 39 is then seated. Hence, fluid flow from cylinder groove 16 can occur only through the piston groove 23 and past the check valve 27 to chamber 72. Likewise, fluid flowing from the branch line 21 into cylinder groove 17 cannot flow through piston groove 25 to the right end of the piston because check valve 49 is seated, and, hence, flow can only occur from groove 17 through the piston groove 24 and past check valve 42 to chamber 73. Fluid flowing through the chambers 72 and 73 passes through the passages 70 and 71 and out through the ports 74 and 75 to the common line 55, the ports 74 and 75 being maintained open by pressure transmitted from passage 71 through passage 76 to the right end of the sleeve 58. The ports 74 and 75 introduce a pressure drop proportional to the flow, and as long as the flows from the two branch lines 20 and 21 are the same, equal pressures exist in the chambers 72 and 73 and the throttling effect of shoulder 24a from cylinder groove 17 to piston groove 24 is equal to the throttling effect of shoulder 23a to fluid flow from cylinder groove 16 to the piston groove 23. However, if fluid tends to flow into the valve faster from branch 21 than branch 20, the pressure will become higher in chamber 73 than in chamber 72, moving the piston to the left to increasingly throttle fluid flow at shoulder 24a and decreasingly throttle fluid flow at shoulder 23a until equality of flow is again restored. If the flow into the valve from branch line 20 becomes greater than the flow from branch 21, the reverse condition prevails, the pressure in chamber 72 rising above that in chamber 73, and moving the piston to the right to increasingly throttle flow past shoulder 23a and decreasingly throttling flow past shoulder 24a.

It will be apparent that the placing of the check valves in the main piston provides a simple structure that can be readily manufactured and serviced. Furthermore, it provides a very simple body structure, requiring much less machine work than the valves of this type previously manufactured.

It is important in a valve of this type, particularly when the flow is from the common line 55 into the branch lines 20 and 21, that all of the fluid entering one branch line 20 pass through the metering port 74 and that all of the fluid entering the other branch line 21 pass through the other metering port 75. This means that there should be no leakage along the surface of piston 15 from one body groove 16 to the other body groove 17, or vice versa. However, in a practical valve, the piston cannot be fitted so tightly in the cylinder that there is no leakage whatsoever. We, therefore, make provision that whatever leakage there is along the piston into grooves 16 and 17 will be from that end of the piston adjacent the groove. This is done by providing a pair of annular grooves 78 and 79 near the middle of the piston and connecting each groove to the end of the piston to which it is closest. Thus, referring to Fig. 5, the groove 78 is connected to the left end of the piston through a port 80 and the hole 44, and the groove 79 is connected to the right end of the piston through a port 81 (Fig. 4) and the hole 31. Obviously, therefore, groove 78 always contains fluid at the same pressure existing at the left end of the piston, and the groove 79 always contains fluid at the pressure existing at the right end of the piston. Except while the piston is moving to compensate for changes in resistance to flow in the two branch lines 20 and 21, the pressures at the opposite ends of the piston are substantially equal. Whenever there is a substantial difference in the resistance to flows in the two branch lines 20 and 21, the pressures in the grooves 16 and 17 will be substantially different, and without the grooves 78 and 79, there would be a crossflow of leakage fluid through the clearance between the piston and cylinder between the grooves 23 and 24. However, the grooves 78 and 79 prevent such cross flow because the pressures in grooves 78 and 79 are always substantially the same.

As an example, assume that as a result of substantial increase in the resistance to flow through the branch line 20 as compared to the branch line 21, the piston 15 moves in such direction as to permit relatively free flow from the piston groove 22 into the groove 16 while greatly throttling flow from the piston groove 25 into the groove 17. Under these conditions, the pressure in cylinder groove 16 will be high compared to the pressure in cylinder groove 17, and without the grooves 78 and 79, there would be leakage of fluid from cylinder groove 16 into piston groove 23, thence along the clearance between the piston and cylinder into the piston groove 24 and thence into the cylinder groove 17 and the line 21. Obviously, therefore, the fluid entering the line 21 would consist in part of fluid flowing through the metering port 74 instead of consisting solely of fluid flowing through the metering port 75, as it should be. However, such cross flow as has been described is rendered impossible by the groove 78 and 79 because those grooves are always filled with fluid that is at higher pressure than the pressure in either the cylinder groove 16 or the cylinder groove 17 so that whatever leakage there is, is from the groove 78 to the groove 16 and from the groove 79 to the groove 17. As a result, regardless of the unavoidable leakage along the piston, all of the fluid entering the branch line 20 flows through the metering port 74 and all of the fluid that enters the branch line 21 flows through the metering port 75. Obviously, the grooves 78 and 79 could be located in the cylinder wall instead of the piston, but it is easier to place them in the piston.

If it is not necessary to control fluid flow in both directions, the valve can be simplified by eliminating all the check valves in the piston and one set of grooves on the piston. Thus, if it is necessary only to handle flow from the common line 55 to the branch lines 20 and 21, the piston grooves 23 and 24 can be omitted. On the other hand, if flow is only from the branch lines 20 and 21 to the common line 55, the piston grooves 22 and 25 can be omitted. Hence, the same body can be used for both reversible and non-reversible models of the valve, thereby reducing production cost, and enabling conversion of valves in the field by merely changing the pistons.

We claim:

1. A flow proportioning valve comprising a body having a common fluid connection and a pair of branch connections and defining a cylinder having a pair of longitudinally-spaced ports in its cylindrical wall respectively connected to said branch connections, said body also having fluid passages respectively connecting said common connection with the ends of said cylinder; means for producing pressure drops in said passages proportional to fluid flow therein; a piston in said cylinder movable in response to the difference in pressure acting on opposite ends of said cylinder in either direction from a neutral position, said piston having a pair of annular grooves cooperating respectively with said cylinder ports and having passages therein communicating one groove with one end face and communicating the other groove with the other end face of the piston; each of said piston grooves and its associated cylinder port being so positioned relative to each other as to equally throttle fluid flow at said two ports when said piston is in said neutral position and to unequally throttle fluid flow at said ports when the piston is displaced either way from said neutral position, the arrangement being such that movement of said piston in response to departure of the pressures at opposite ends of the piston from equality variably throttles flow through said ports in such direction as to nullify said departure and maintain the pressures equal at the opposite ends of the piston.

2. A valve as described in claim 1 in which said body comprises a main member having two parallel passages extending longitudinally therethrough and a pair of detachable end closure members in sealing relation with said main member for interconnecting adjacent ends of said parallel passages, one of said parallel passages constituting said cylinder and the other of said parallel passages having connection intermediate its ends with said common connection through said means for producing pressure drops.

3. A flow proportioning valve comprising a body having a main fluid connection and a pair of branch connections connected by branch passages to said main connection and having flow resistance means in each branch passage and throttling means in each branch passage responsive to departure of the pressures therein between the flow resistance means and the throttling means from a given ratio for varying said throttling means so as to nullify said departure and maintain the flows in the two branch passages in constant ratio, in which: the throttling means comprises a cylinder having a pair of ports respectively connected to said branch connections; a piston movable in said cylinder in either direction from a neutral position and having four annular grooves thereon, two on opposite sides of one cylinder port, and two on opposite sides of the other cylinder port when said piston is in neutral position, said piston having separate passages therein connecting the two grooves of one pair to one end face of the piston and connecting the two grooves of the other pair to the other end face of the piston; check valve means in said piston passages restricting flow in the two passages communicating with each end of the piston to opposite directions; the arrangement being such that the flow in either cylinder port is increasingly throttled in response to an increase in the pressure in the end of said cylinder connected to that port relative to the pressure in the other end of the cylinder when the direction of flow is from the branch connections to said main connection and vice versa when the direction of flow is from said main connection to the branch connection.

4. A valve as described in claim 1 in which said fluid passages in said body connecting said common connection with both ends of said cylinder comprise: a first passage extending through said body and connecting at its opposite ends to opposite ends of said cylinder, a second passage extending through said body at an angle to and intersecting said first passage, one end of said second passage constituting said common fluid connection, means closing the other end of said second passage, a sleeve reciprocal in said second passage having a pair of diametrically opposite ports communicating with opposite ends of said first passage, a piston reciprocal in said sleeve to cover and uncover the ports therein, spring means urging said sleeve in one direction and separate spring means urging said piston in the opposite direction to normally cover the ports in said sleeve, one end of said sleeve and one end of said piston being exposed to fluid pressure in said one end of said second passage, and means for applying fluid pressure from one end of said first passage to said other end of said second passage, the construction and arrangement of said sleeve, piston, and springs being such that said piston is displaced to uncover said sleeve ports in response to pressure in said one end of said second passage exceeding the pressure in the other end and said sleeve is moved to uncover said sleeve ports in response to pressure in the other end of said passage exceeding the pressure in said first end thereof.

5. A valve for proportioning the flow rates in a pair of ducts connected in parallel relation to each other and in series with a common duct containing means for circulating fluid in either direction therethrough said valve comprising: a body member defining a cylinder having a pair of longitudinally-spaced ports in its cylindrical wall adapted to be connected to said pair of ducts, and having a common connection adapted to be connected to said common duct; means in said body connecting said common connection with opposite ends of said cylinder and producing pressure drops proportional to flow in response to fluid flow between the said common connection and opposite ends of said cylinder; a piston in said cylinder reciprocal in either direction from a neutral position, a first pair of annular grooves on said piston associated with said respective cylinder ports and connected by passages through said piston to opposite ends thereof for inversely throttling fluid flow from said respective cylinder ports to opposite ends of said cylinder in response to movement of said piston, the arrangement of the grooves being such with respect to their associated cylinder ports that the flow in each port is increasingly throttled in response to an increase in the pressure in the end of said cylinder connected to that port relative to the pressure in the other end when the direction of flow is from said ports to said common connection; check valves in said piston passages preventing flow therethrough from the ends of said piston to said first pair of piston grooves; a second pair of annular grooves on said piston associated with said respective cylinder ports and passages in said piston connecting said grooves to opposite ends of the piston, for inversely throttling fluid flow from opposite ends of said cylinder to said respective cylinder ports in response to movement of the piston, the arrangement of said second pair of grooves being such with respect to their associated cylinder ports that the flow in each port is decreasingly throttled in response to an increase in the pressure in the end of said cylinder connected to that port relative to the pressure in the other end when the direction of flow is from said common connection to said ports, and check valves in said last-mentioned piston passages for preventing flow therethrough from said second pair of grooves in the piston to the ends of said piston.

6. A valve for the distribution of fluids comprising: means for dividing a fluid flow along two paths, means in each of said paths adapted to offer a resistance to fluid flow, a cylinder having its ends communicating with said paths, a piston in the cylinder, and ports in the cylinder providing a continuation of said paths, said ports being throttled by said piston and being adapted to have their free areas inversely varied by the piston when the piston moves in response to differences in the pressure drops through said resistance means, said cylinder and piston having cooperating sliding surfaces separating said ports and providing a leakage path between said ports, a pair of annular grooves in one of said surfaces interrupting said leakage path, and passage means connecting each groove to the adjacent end of said cylinder.

7. A valve as described in claim 1 having a second pair of annular grooves interrupting the leakage path through the piston cylinder clearance between said cylinder ports, and means providing fluid connection between each groove of said second pair and the end of said cylinder adjacent that groove.

WALTER C. TRAUTMAN.
ALVIN A. MEDDOCK.